United States Patent [19]

Hooke

[11] Patent Number: 5,389,465
[45] Date of Patent: Feb. 14, 1995

[54] SNAP FIT BATTERY CASE AND METHOD

[75] Inventor: John Hooke, Warrensburg, Mo.

[73] Assignee: Hawker Energy Products, Inc., Warrenburg, Mo.

[21] Appl. No.: 187,789

[22] Filed: Jan. 26, 1994

Related U.S. Application Data

[63] Continuation of Ser. No. 887,436, May 21, 1992, abandoned.

[51] Int. Cl.⁶ .............................................. H01M 2/08
[52] U.S. Cl. ..................... 429/172; 429/174; 429/185
[58] Field of Search ............... 429/172, 171, 174, 175, 429/176, 183, 185, 163

[56] References Cited

U.S. PATENT DOCUMENTS

| | | | |
|---|---|---|---|
| 1,520,495 | 12/1924 | Fleming et al. | 429/175 |
| 1,616,615 | 2/1927 | Fleming et al. | 429/175 |
| 3,172,782 | 3/1965 | Jache | 429/225 |
| 3,276,913 | 10/1966 | Sabatino et al. | 429/185 |
| 3,298,870 | 1/1967 | Sabatino | 429/185 |
| 3,600,232 | 8/1971 | Daguenet | 429/163 X |
| 3,647,556 | 3/1972 | Cox | 429/175 X |
| 4,460,663 | 7/1984 | Stutzbach et al. | 429/176 X |
| 4,670,362 | 6/1987 | Wiacek et al. | 429/174 |

*Primary Examiner*—Anthony Skapars
*Attorney, Agent, or Firm*—Lorusso & Loud

[57] ABSTRACT

In one aspect the invention is a lead-acid cell of the type having a container. The container has a jar and a lid. The jar has an upper perimeter defining an opening matingly engaging and closed by the lid. The container houses at least one positive electrode plate, at least one negative electrode plate, a separator interposed between the electrode plates, acid electrolyte absorbed in the electrode plates and separator, and electrical connections from the electrode plate(s) through the container to an output terminal location. The lid is sealed to the jar. The cell is improved by the lid and the jar including a mechanical means for retaining the mating relationship of the lid and with the jar, when the lid is placed upon the upper perimeter, of the jar.

6 Claims, 4 Drawing Sheets

SNAP FIT BATTERY CASE AND METHOD

This is a continuation of application Ser. No. 07/887,436, filed on May 21, 1992, now abandoned.

BACKGROUND OF THE INVENTION

(1) Field of The Invention

This invention relates to lead-acid cells or batteries and particularly to the provision of a battery container (or case) in which the jar and lid are sealingly joined without the need for placement of the combination in a fixture for curing or hardening of the substance affixing the lid to the jar.

Battery cases are commonly made of engineering plastic material which is resistant to sulfuric acid, including Noryl ® (polyphenylene oxide), ABS, polypropylene, and the like; and they include at least a jar where the plates, separators, and acid reside and a lid which is sealingly joined to the jar. Typically, sulfuric acid resistant epoxy is used to join the lid to the jar. The epoxies that are adequately effective at maintaining the joint are slow cure epoxies that typically take 4–6 hours to cure to a handling state and 16–20 hours for a full cure.

During cure, the hydraulic force produced by the epoxy, as well as other forces, are enough to cause the lid to partially separate from the jar, disrupting the seal. Even when the battery is left to cure inverted with the entire weight of the jar and all components contained within weighing upon the joint, the seal maybe disrupted by separation caused by the hydraulic and other forces.

(2) Description of The Prior Art

To overcome this problem the battery container is typically placed in a fixture, after the epoxy is applied to the region to be joined, and allowed to stand undisturbed until an adequate state of cure is reached that allows safe handling of the battery. Such fixturing adds expense in the production of the battery by requiring more equipment in the production line (the fixture and any equipment used in applying and removing the fixture), increasing complexity of assembly and increasing either labor or machine time during production.

SUMMARY OF THE INVENTION

Accordingly, the present invention has as an object the provision of a battery container arrangement rendering the need for placing the case within a fixture to sealingly join the lid to the jar is eliminated.

The present invention has as another object the provision of a method, incorporating the battery container so formed, wherein the step of fixturing the case is eliminated.

In one aspect, the invention is a lead-acid cell of the type having a container. The container has a jar and a lid. The jar has an upper perimeter defining an opening matingly engaging and closed by the lid. The container houses at least one positive electrode plate, at least one negative electrode plate, a separator interposed between the electrode plates, acid electrolyte absorbed in the electrode plates and separator, and electrical connections from the electrode plate(s) through the container to an output terminal location. The lid is sealed to the jar. The cell is improved by the lid and the jar including mechanical means for retaining the mating relationship of the lid and the jar when the lid is placed upon the upper perimeter of the jar.

In another aspect, the invention is a method of assembling a lead-acid cell container comprising the steps of providing a generally parallelepiped jar with an upper perimeter defining an opening; providing a generally planar lid, that lid having a mating portion which matingly corresponds to and is engageable with the upper perimeter of the jar; providing an engageable mechanism, in the jar and the lid, for cooperatively retaining in locking relationship the mating relationship between the jar and the lid when the lid is placed adjacent to the upper perimeter and the mechanical means are engaged; conditioning the mating portion and the upper perimeter for sealing engagement thereof; bringing the lid and the jar into sealing engagement; and allowing the container to stand generally undisturbed until the seal created by the conditioning and engagement is adequately stable.

BRIEF DESCRIPTION OF THE DRAWINGS

Preferred embodiments of the invention will be illustrated in conjunction with the accompanying drawings, in which like numerals designate like parts, and in which.

PREFERRED EMBODIMENTS OF THE INVENTION

Although the invention is broadly applicable to various types of lead-acid cells and batteries, the detailed description will apply to a normally sealed or "valve-regulated" lead-acid battery of the starved electrolyte type, in which gases generated internally, namely oxygen, are recombined within the battery on charge and overcharge, without significant loss of weight (electrolyte) over its useful life (see U.S. Pat. No. 3,862,861 to McClelland et al.).

Figure 1:
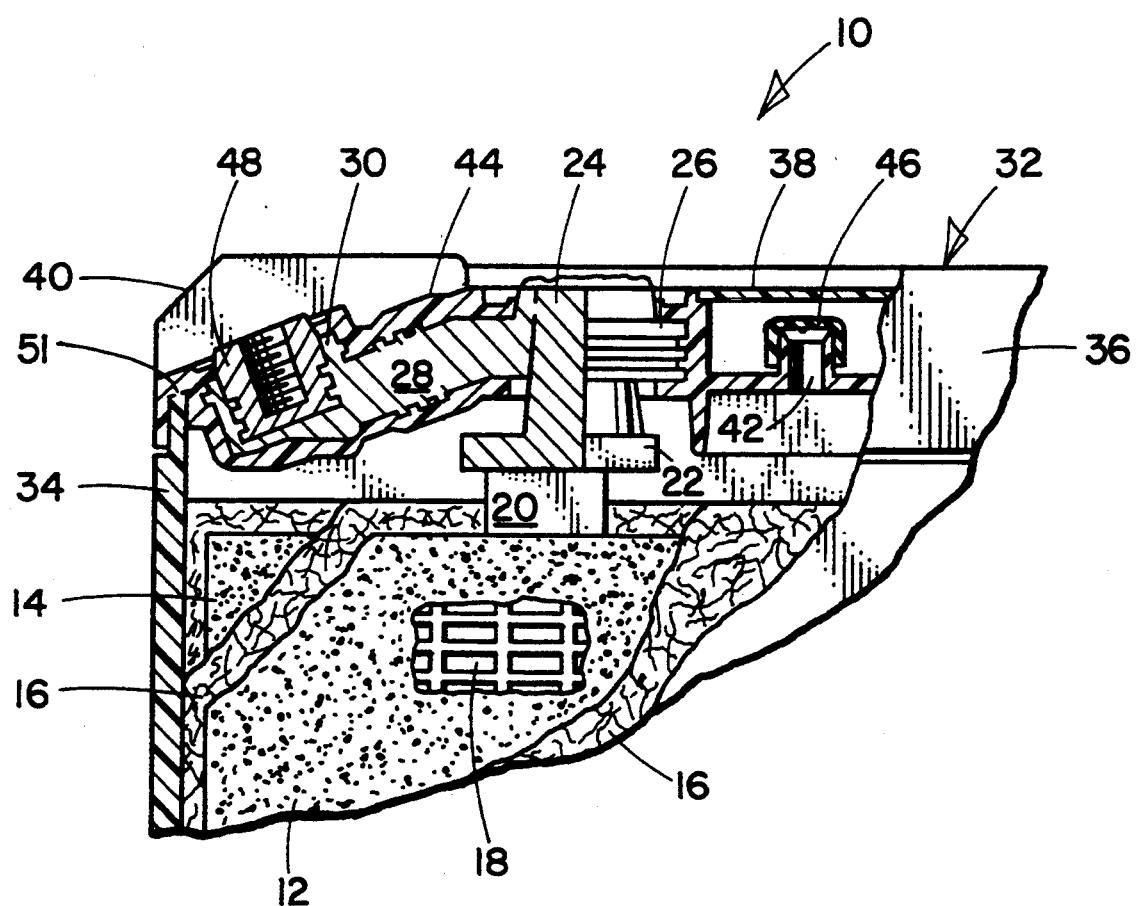
FIG. 1 is an elevational, partial, sectional and broken-away view of a battery in accordance with the invention.

Referring to FIG. 1, battery 10 is composed of a plurality of series connected cells and includes at least one porous positive electrode plate 12, porous negative electrode plate 14, porous absorbent separator 16 interleaved between and pressed against the opposite polarity plates, and a sulfuric acid electrolyte absorbed within the porous plates and separator. Preferably, the plates are formed of lead grids 18 on which the active material of the plate is affixed by pasting, and the grid substrate is preferably provided with integral current collector tabs 20 joined together by the cast-on-strap process to form strap 22. Integral post 24 protrudes from strap 22 and is pillar shaped to matingly fit in post connect portion 26 of the terminal shown generally at 28. The lead utilized in the grid substrate 18 and tab 20, connecting strap 22 and post 24, and terminal connector 28, is preferably of high hydrogen over-voltage, e.g., pure lead or suitable alloy material, most preferably a lead-tin alloy having a tin content from about 0.3 to about 3.0 weight percent. The acid electrolyte used in the battery normally readily wets and creeps along the surface of these lead components, particularly along lead oxide films which are naturally present on the surface of the component parts.

The components of the battery are housed within container 32. The container generally comprises a standard open-mouthed jar 34 to which is affixed inner lid member 36. The inner lid is a fairly complex molded part equipped with handle openings 40 for lifting the battery, vent openings 42 closed with bunsen resealable valves 46 to permit gas release if the internal pressure of the battery exceeds a predetermined threshold, and enshrouding portion 44 which is molded about terminal 28, including terminal connect and post connect portions 30 and 26, respectively, leaving enough of the portions exposed to allow post and working environment connection to terminal 28. The entire inner lid 36 is desirably formed by injection molding a suitable engineering plastic material which is resistant to sulfuric acid, including such materials as Noryl ® (polyphenylene oxide), ABS, polypropylene, and the like. An intermediate cover 38 (FIG. 1) is positioned over the bunsen valve(s), and may incorporate a flash arrestor (not shown). Desirably an outer, cosmetic top (not shown) is fitted over inner top 36.

The terminal 28 is provided on its outer surface with a layer of elastic adhesive material (not shown) interposed between terminal 28 and the shrouding portion of plastic 44 of the inner molded lid member.

The elastic adhesive material sealingly contacts the outer surface of terminal 28 and shrouding portion of plastic 44, as well as elastically filling any gap between terminal 28 and shrouding portion 44. The elastic adhesive in conjunction with the terminal 28 and shrouding portion 44 presents, at least, a physical barrier to retard or eliminate acid creepage along the surface of terminal 28.

The preferred elastic adhesive coating materials are resinous materials which have the capability to bond to at least a lead connector member 45, in addition to having elastomeric-like properties to permit alternate stretching and limited compression during thermal cycling.

Elastic adhesive materials which have been found suitable for use in the invention include one part or two-part polyurethane elastomers, formed from suitable isocyanate and active hydrogen supplying monomers or blocked polymers. One elastic adhesive that has been found especially useful is sold under the trade name CHEMLOK ® EP4802-75 TPE adhesive (Lord Corporation, Elastomer Products Division). This material is formed from an adhesive component having a viscosity of 1,000 cps at 100° F., and non-volatile content of 18 percent, a weight/gallon of 7.5 lbs., a flash point of 41° F., and which may be diluted in toluene, xylene, or methylethyl ketone. The curing agent component for the adhesive is sold under the trade name CHEMLOK ® EP4802-69S and has a total solids content of 50 percent, a weight/gallon of 11.2 lbs., a rapid cure rate, and a flash point exceeding 200° F. Another class of elastic adhesive coating materials which has been found suitable includes various polysilane-containing elastomers, preferably urethane elastomers such as CHEMLOK ® 487 (Lord Corporation).

Figure 2:
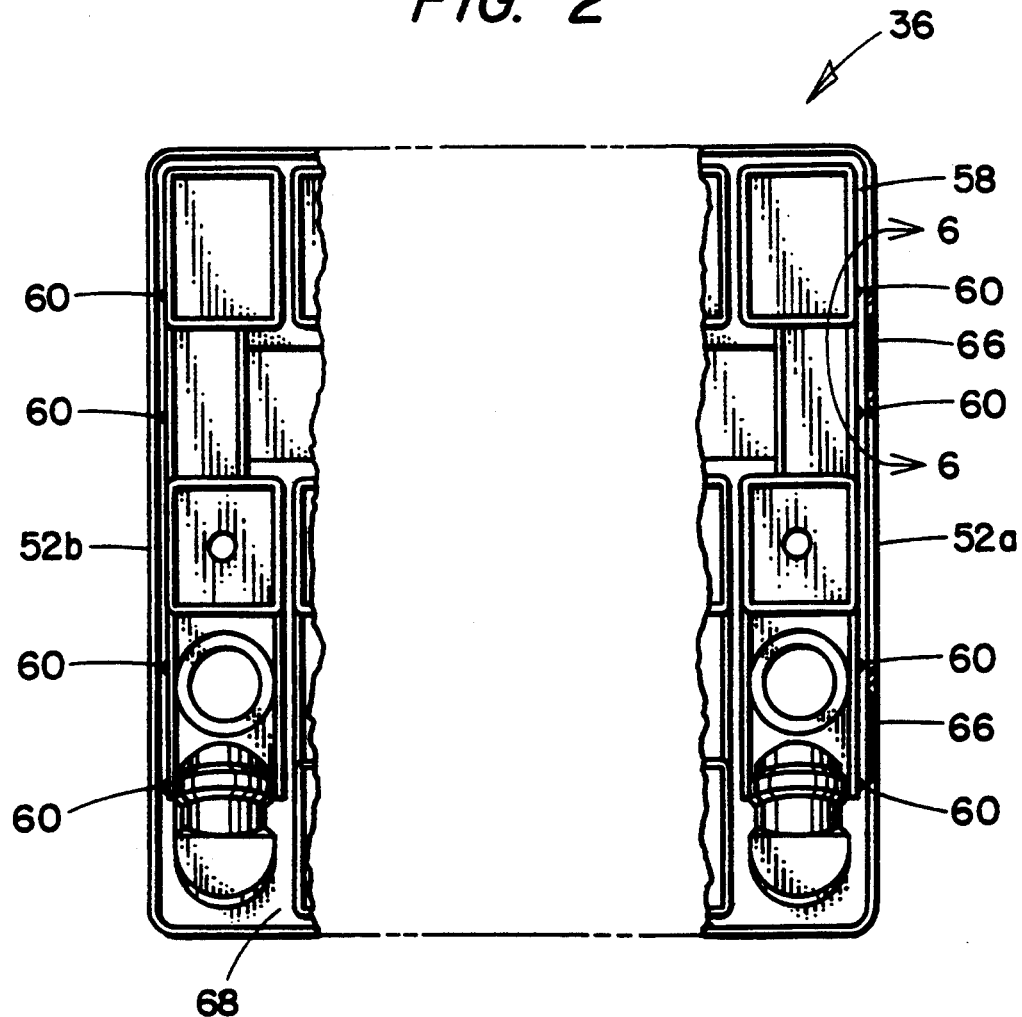
FIG. 2 is a bottom view of the lid showing an urging projection and indentation.
Figure 3:
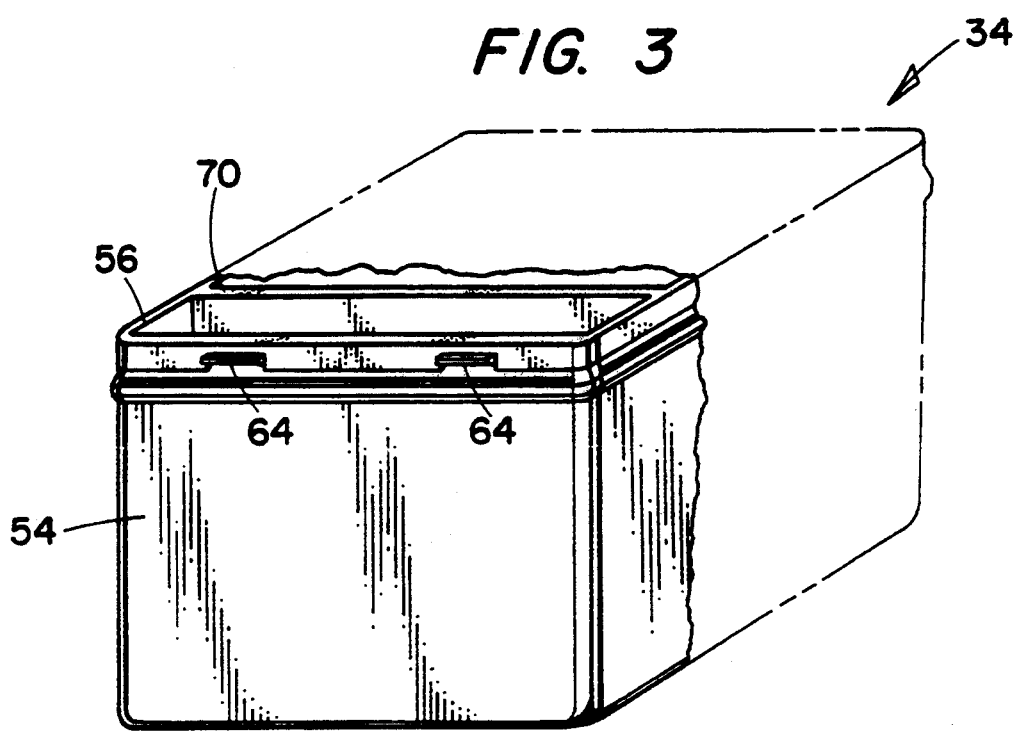
FIG. 3 is a perspective view of the jar showing retaining projections.

Now referring to FIGS. 2 and 3, lid 36 fits matingly upon jar 34 with either side 52a or 52b substantially aligned with wall 54. Perimeter 56 fits within channel 58.

Figure 4:
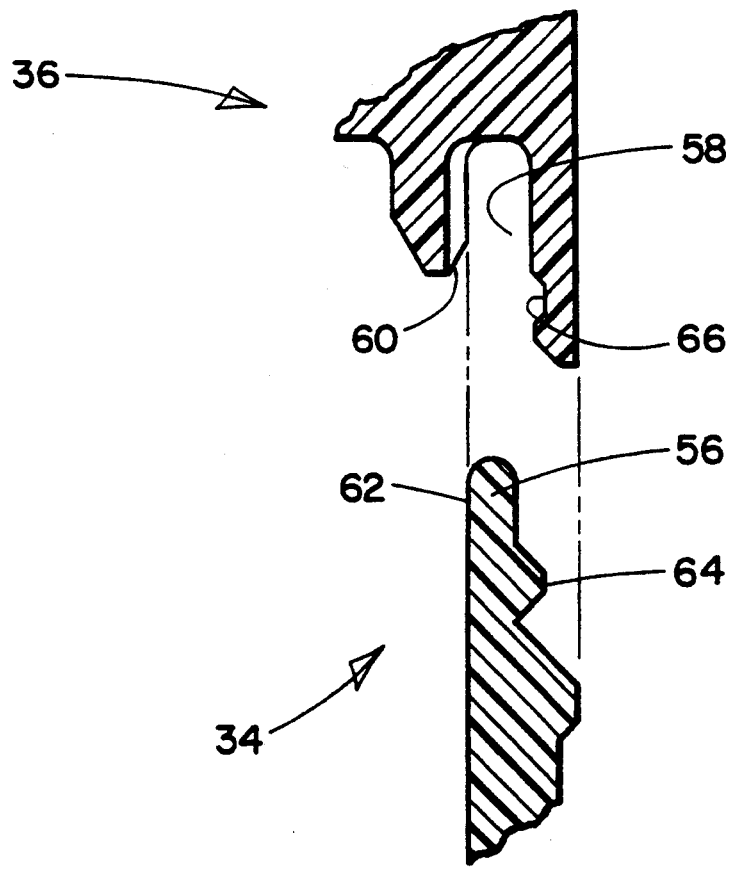
FIG. 4 is an expanded sectional view of the urging projection and the corresponding indentation and retaining projection in the preassembled state.
Figure 5:
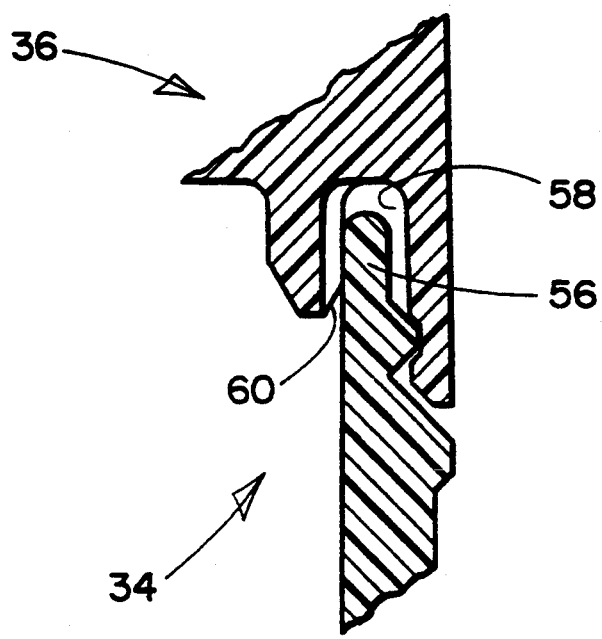
FIG. 5 is an expanded sectional view as in FIG. 4 in the assembled state.
Figure 6:
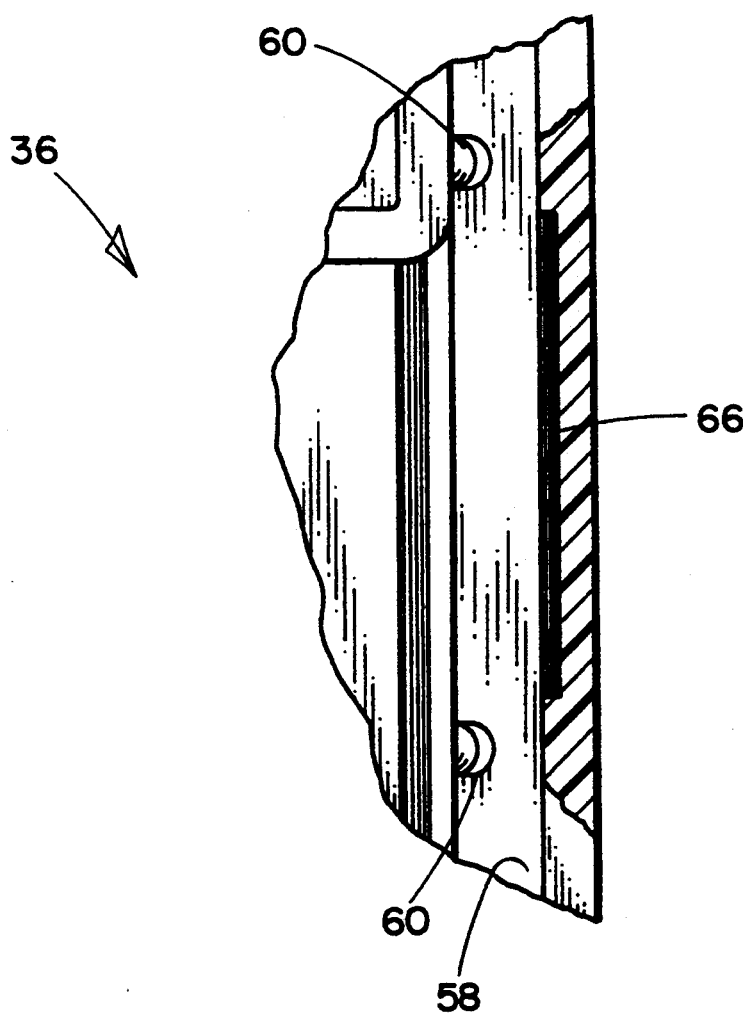
FIG. 6 is a magnified view taken along line 6—6 of FIG. 2.

The relationship of perimeter 56 and channel 58 is more closely depicted in FIGS. 4 and 5. Here it can be seen that as perimeter 56 is inserted into channel 58, urging projections 60 press upon surface 62 thereby forcing retaining projection 64 into indentation 66. This cooperation of retaining projection 64 with indentation 66 results in a locking action (or snap-fit) that retains perimeter 56 and associated jar 34 in mating relationship with channel 58 and associated lid 36.

In this preferred embodiment, the urging projection 60 and indentation 66 are associated with channel 58; and, retaining projection 64 is associated with perimeter 56. However, the reversal of these associations is also contemplated. Further, channel 58 is associated with lid 36 and perimeter 56 is associated with jar 34. It is also contemplated that these associations may be reversed, either independent of or in conjunction with the first mentioned reversal.

The preferred method of assembling the battery includes filling the jar 34 with all associated internal components (12, 14, 16, 18, 20, 22, 24); laying the lid 36 with a surface 68, depicted in FIG. 2, facing upwards; applying an adhesive in channel 58 and all along surface 68 that contacts either perimeter 56 or internal walls 70; inverting jar 34 so that the opening defined by perimeter 56 is facing downward; placing jar 34 upon lid 36, with perimeter 56 inserted in channel 58 to the extent necessary for engagement of the snap-fit comprising urging projections 60, indentations 66 and retaining projections 64. The container is left standing inverted and generally undisturbed, with the weight of the jar 34 and its associated components bearing upon the union of perimeter 56 and channel 58 until a state of cure is achieved that allows handling without undue risk of disturbing the adhesive and associated seal and joint. As used herein, "generally undisturbed" refers to limiting the tipping or jostling of the container to a degree that the adhesive seal is not broken.

The preferred adhesive is epoxy. However, other adhesives which will bond and seal the material of the container while being adequately resistent to sulfuric acid are also contemplated.

It should be noted that the snap-fit and associated method eliminate the need to place the container in a fixture to overcome the hydraulic forces of the adhesive and other forces while curing.

While certain representative embodiments and details have been shown for the purpose of illustrating the invention, it will be apparent to those skilled in this art that various changes and modifications may be made therein without departing from the spirit or scope of the invention. The invention illustratively disclosed herein suitably may be practiced in the absence of any element which is not specifically disclosed herein.

What is claimed is:

1. In a snap-fit battery case for a lead-acid cell, said case having a jar and a lid, said jar having a perimeter defining an opening, said case housing at least one positive electrode plate, at least one negative electrode plate, a separator interposed between the electrode plates, acid electrolyte absorbed in the electrode plates and separator, and electrical connections each extending from an electrode plate through the case to an output terminal, said lid being sealed to said jar, an improvement comprising:

a peripheral channel in one of said lid and said jar, indentation means in a first wall of said channel and urging projection means in an opposite second wall of said channel, said urging projection means protruding from said second wall into said channel and toward said first wall, the other of said lid and said jar having a perimeter wall defined by a substantially uninterrupted first surface and an irregularly-shaped second surface, retaining projection means extending from said second surface and configured complementarily to said indentation means, said channel being adapted to slidingly receive said perimeter wall in a direction from an open end of said channel to a closed end of said channel such that said perimeter wall first surface engages said channel urging projection means to bias said perimeter wall towards said channel first wall and said channel indentation means is adapted to receive said perimeter wall projection means in snap-fit fashion so as to retain said lid and said jar in mating relationship.

2. The improvement in accordance with claim 1 wherein said urging projection means comprises a plurality of discrete urging projections on at least two opposite sides of said one of said lid and said jar, and said indentation means comprises a plurality of discrete indentations on at least said two sides of said one of said lid and said jar, each of said indentations being disposed substantially between two of said projections.

3. The improvement in accordance with claim 2 wherein said perimeter wall retaining projection means comprise a plurality of discrete perimeter wall retaining projections on at least two sides of said other of said lid and said jar corresponding to said at least two sides of said one of said lid and said jar, each of said perimeter wall retaining projections having a length such as to be engaged along opposite ends thereof by two of said urging projections to urge said perimeter wall retaining projections, respectively, into said channel indentation means in said snap-fit fashion.

4. The improvement in accordance with claim 3 wherein each of said urging projections is provided at its free end with a bevelled configuration, said perimeter wall being rounded at its free end such that said bevelled end is adapted to be engaged by said perimeter wall free end and to guide said perimeter wall free end into said channel upon joining of said jar and said lid.

5. The improvement in accordance with claim 1 wherein said channel is provided with adhesive in contact with said perimeter wall.

6. The improvement in accordance with claim 1 wherein said lid is of injection molded plastic and said channel is in said lid.

* * * * *